United States Patent [19]

Leonhard

[11] Patent Number: 4,722,303

[45] Date of Patent: Feb. 2, 1988

[54] METHOD FOR OPERATING AN INTERNAL COMBUSTION ENGINE

[75] Inventor: Rolf Leonhard, Schwieberdingen, Fed. Rep. of Germany

[73] Assignee: Robert Bosch GmbH, Stuttgart, Fed. Rep. of Germany

[21] Appl. No.: 872,735

[22] Filed: Jun. 10, 1986

[30] Foreign Application Priority Data

Jul. 4, 1985 [DE] Fed. Rep. of Germany ....... 3523855

[51] Int. Cl.⁴ .............................................. F02B 43/08
[52] U.S. Cl. ................... 123/3; 123/DIG. 12; 123/1 A
[58] Field of Search ................... 123/1 A, 3, DIG. 12

[56] References Cited

U.S. PATENT DOCUMENTS

| | | | |
|---|---|---|---|
| 4,366,782 | 1/1983 | Jackson et al. | 123/3 |
| 4,425,876 | 1/1984 | Rutledge et al. | 123/3 |
| 4,441,461 | 4/1984 | Yoon et al. | 123/3 |
| 4,476,818 | 10/1984 | Yoon | 123/3 |
| 4,499,863 | 2/1985 | Gandhi et al. | 123/3 |
| 4,567,857 | 2/1986 | Houseman et al. | 123/3 |

OTHER PUBLICATIONS

SAE Technical Papers, Series 790 427 (Feb. 25–Mar. 2, 1979)–Methanol Decomposition Bottoming Cycle for IC Engines–Purohit et al.

Primary Examiner—E. Rollins Cross
Attorney, Agent, or Firm—Edwin E. Greigg

[57] ABSTRACT

A method is proposed for operating an internal combustion engine with decomposition gas generated by gasifying methanol into hydrogen and carbon monoxide in a gasification reactor. The enthalpy necessary for gasifying the methanol is obtained from the heat of the exhaust gas of the engine. To attain high efficiency and high power, the decomposition gas is injected at high pressure directly into the combustion chamber of the engine.

21 Claims, 3 Drawing Figures

METHOD FOR OPERATING AN INTERNAL COMBUSTION ENGINE

BACKGROUND OF THE INVENTION

The invention is based on a method as generally defined hereinafter. Waste heat recovery by endothermic fuel gasification, e.g., methanol gasification, is known for instance from the SAE Technical Paper, Series 790427, entitled "Methanol Decomposition Bottoming Cycle for IC Engines". The methanol gasification proposed there provides for the gas from decomposition to be admixed with the aspirated air or charge air. However, although this provision makes it possible to improve the overall efficiency by a maximum of 20% as compared with operation with liquid fuel, nevertheless the maximum power or engine load is markedly less than the possible full load of a conventional Diesel or Otto engine, because the air supply rate is decreased to correspond with the quantity of gas supplied, so knocking may sometimes occur.

OBJECT AND SUMMARY OF THE INVENTION

The method according to the invention has the advantage over the prior art that it can be applied to high-compression internal combustion engines, and that by combining waste heat utilization—to attain endothermic methanol gasification—with high-pressure injection of the decomposition gas comprising hydrogen and carbon monoxide, overall efficiency can be increased by up to 30% as compared with Diesel operation. This increase in overall efficiency is due to the 20% increase in calorific value produced by the endothermic methanol gasification, combined with an increase in the thermodynamic efficiency of the engine resulting from the high-pressure injection of the decomposition gas toward the end of the compression phase.

Because of the 20% higher calorific value, as compared to the stoichiometric air quantity, and the increase in engine efficiency due to better air utilization, a 30% increase in power as compared with Diesel operation is also possible. Furthermore, detoxification of the exhaust gas in terms of soot, hydrocarbons and $NO_x$ can be expected, with gas injection operation according to the invention.

Unlike operation with liquid methanol, operation with pre-gasification does not require highly pure fuel. The admixture of water or other alcohols, which from an engineering standpoint is difficult to avoid, does affect the efficiency and power level slightly but does not impair satisfactory engine operation.

High-pressure gasification of the methanol has the advantage that the decomposition gas reactor can be very compact, since with the dwell time required for gasification the reactor volume decreases in proportion to the pressure. Furthermore, the decomposition gas reactor can simultaneously perform the function of a gas reservoir, which is advantageous for non-steady operating states.

The invention will be better understood and further objects and advantages thereof will become more apparent from the ensuing detailed description of preferred embodiments taken in conjunction with the drawings.

DESCRIPTION OF THE PREFERRED EMBODIMENT

Figure 1:
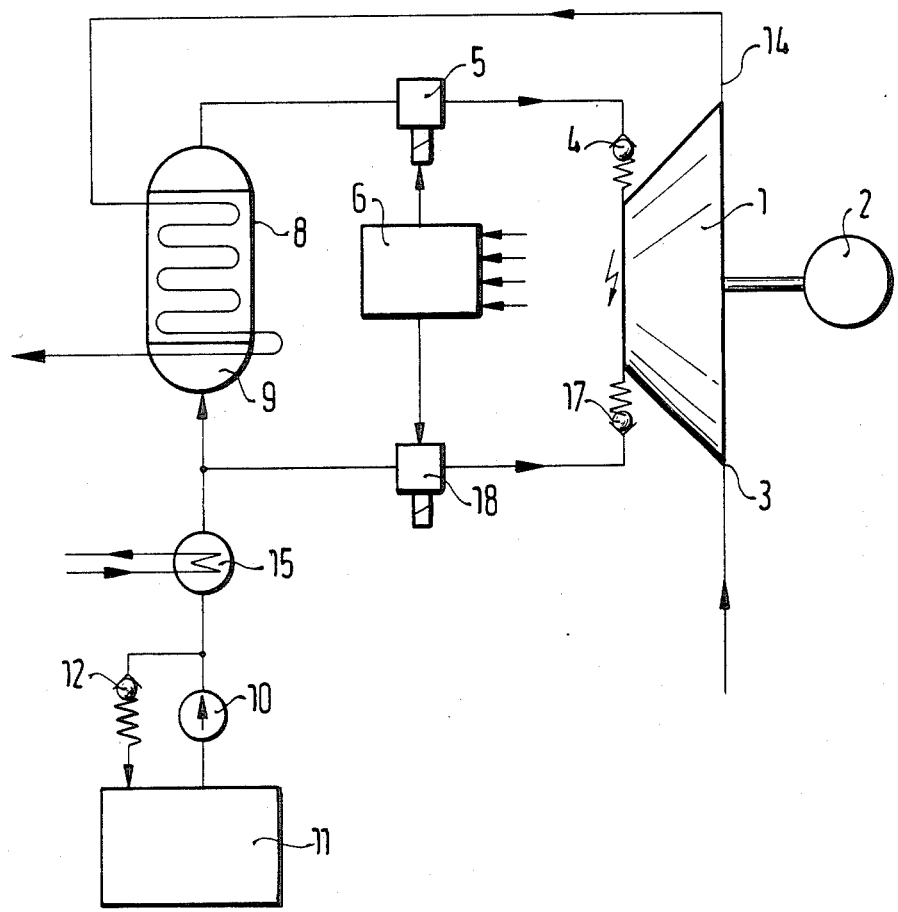
FIGS. 1-3 show three simplified diagrams of an internal combustion engine and a decomposition gas reactor.

An internal combustion engine 1, which drives a consumer apparatus 2, is supplied with the air required for combustion at 3 by means of aspiration or supercharging. Its combustion chamber is supplied with decomposition gas, which predominantly comprises hydrogen and carbon monoxide and is generated from methanol, through a gas injector valve 4. The quantity of gas, adapted to the load and to other operating conditions of the engine 1, is apportioned by a magnetic valve 5 which is connected to a central unit 6 that controls the time and duration of the gas injection. The decomposition gas is injected at high pressure, in a range from 80 to 100 bar, for instance, during the compression stroke; the goal is for fuel injection to take place as late as possible.

The decomposition gas, which when gasification is complete comprises hydrogen and carbon monoxide in a ratio of 2:1 by volume, is generated at the pressure required for the gas injection in a gasification reactor 8, which is preceded by a vaporizer 9. A high-pressure pump 10 pumps the liquid methanol out of a supply tank 11 into the vaporizer 9 and serves together with a pressure regulating valve 12 to maintain the high gas pressure in the gasification reactor 8.

The enthalpy required for gasification of the methanol to produce decomposition gas is supplied from the exhaust gas of the engine 1, which leaves the engine at 14. The gasification reactor 8 is preferably embodied as a counterflow heat exchanger, for instance a multi-tube reactor. For maximally complete utilization of the thermal energy of the exhaust gas, the gasification is effected catalytically at reaction temperatures of approximately 250° to 300° C. A further increase in the waste heat recovery is attainable if the liquid methanol, before its entry into the vaporizer 9, is pre-heated in a heat exchanger 15 by the liquid coolant, or cooling air, as the case may be, of the engine 1.

The engine 1 may be operated either with spark ignition, by the Otto method, or with auto-ignition, by the Diesel method. As compared with known Otto engines, gas injection produces an increase in the compression ratio toward the end of the compression, for instance to $\epsilon = 13$ to $15$, yet without the risk of knocking. For the same reason, it is possible to maintain the same compression level of $\Delta = 15$ to $20$ that is typical in direct-injection Diesel engines.

Since waste heat for generating the decomposition gas is unavailable when the engine 1 is started and during engine warmup, in the exemplary embodiment according to FIG. 1 liquid methanol is injected through an injection nozzle 17 into the combustion chamber of the engine 1 during the compression stroke. The injection quantity and the time and duration of the injection are controlled by a magnetic valve 18, which is likewise connected to the control unit 6 and is controlled as a function of operating conditions of the engine 1. During warmup of the engine 1, the ratio between directly injected liquid methanol and decomposition gas generated by the gasification reactor is adapted to the waste heat recovery and varied continuously.

Figure 2:
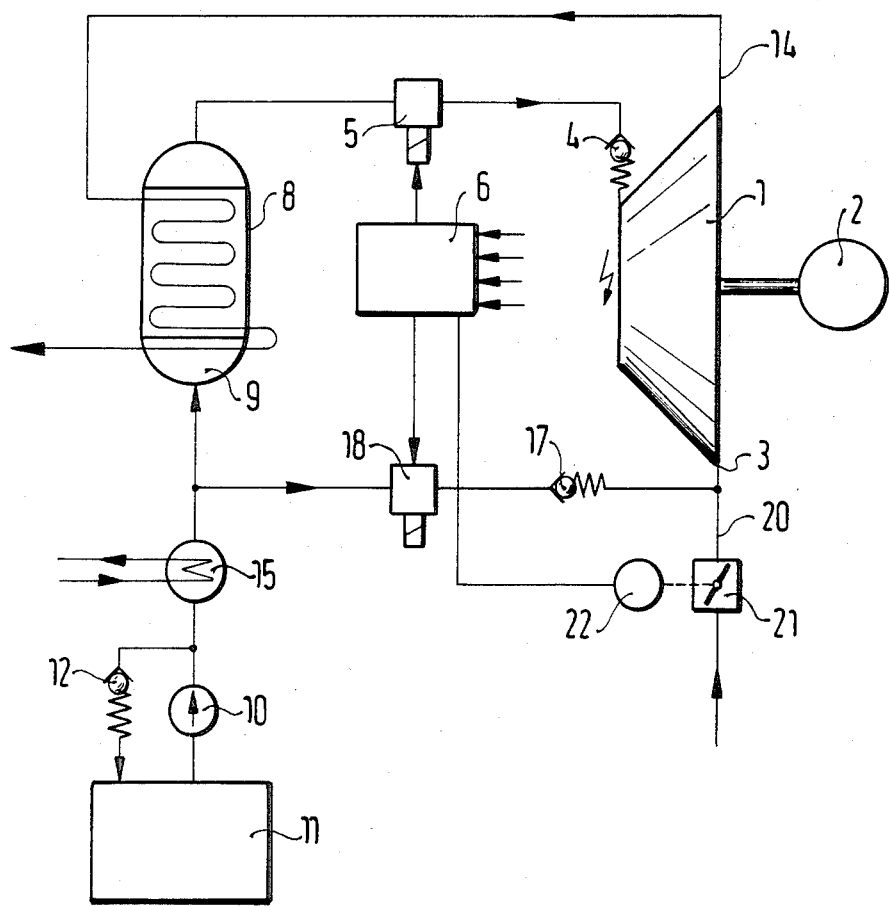

As an alternative to injecting liquid methanol into the combustion chamber of the engine 1, in the exemplary embodiment of FIG. 2 the methanol is injected through the injection nozzle 17 into the air intake tube 20. In order to adapt the fuel-air ratio well to the mixture formation, a throttle valve 21 is disposed in the intake tube 20, its position being varied continuously in accordance with the ratio between the methanol injected into the intake tube 20 and the decomposition gas from the gasification reactor 8 as well as in accordance with engine operating conditions. To this end, the control motor 22 is also connected to the control unit 6.

Figure 3:
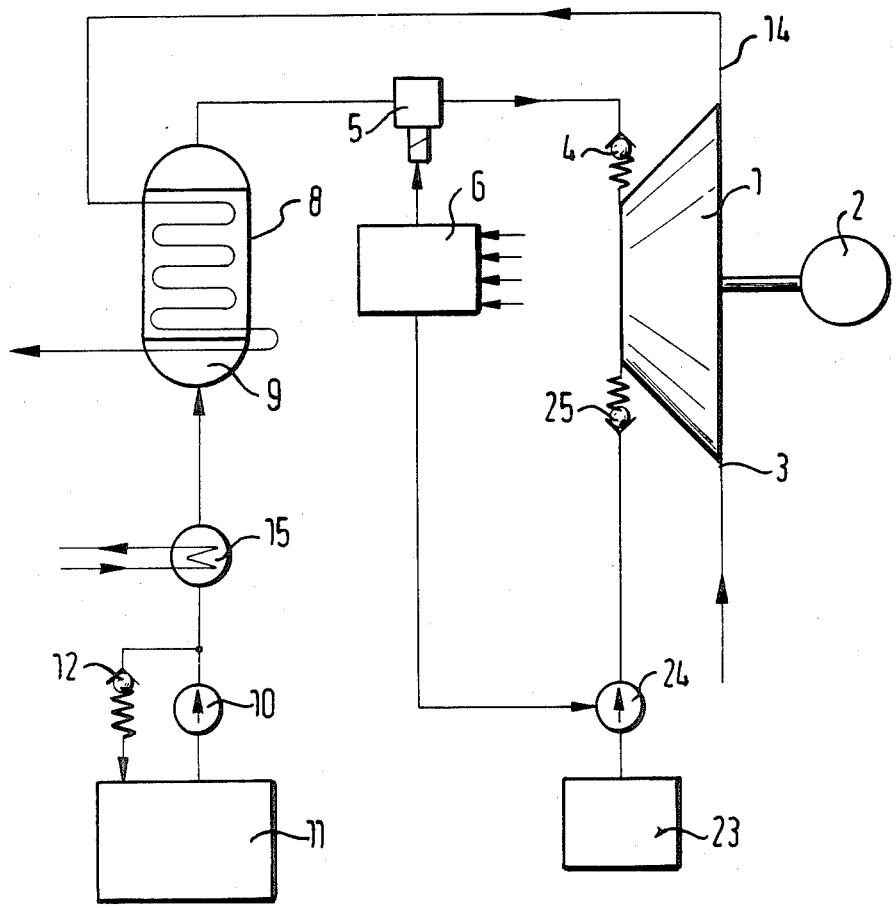

The exemplary embodiment of FIG. 3 relates to an auto-igniting engine 1 with a compression ratio of $\epsilon = 15$ to 20. Here, ignition of the mixture of decomposition gas and air is effected by high-pressure injection of readily ignitable fuel, such as Diesel fuel. In terms of energy, the proportion of additional fuel used for ignition during normal operation amounts to approximately 5 to 10% of the total fuel energy supplied. The additional igniting fuel is drawn from a supply tank 23, metered by an injection pump 24, and injected through an injection nozzle 25 into the combustion chamber of the engine 1. For metering the fuel injection quantities, the injection pump 24 is connected to the control unit 6. If the heat in the exhaust gas of the engine 1 is not sufficient for complete decomposition of the methanol, as is the case for instance during starting and warmup, then the proportion of igniting fuel that is injected is increased.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A method for operating a freely aspirating or supercharged internal combustion engine with a decomposition gas, generated from methanol, and intake air, comprising the steps of supplying methanol to a gasification reactor, gasifying said methanol therein using heat from exhaust gas produced by the engine, and injecting the decomposition gas at high pressure directly into the combustion chamber of the engine separately from the intake air.

2. A method as defined by claim 1, in which the methanol is gasified at high pressure in a gasification reactor.

3. A method as defined by claim 1, in which the gasification pressure is adapted to the gas injection pressure.

4. A method as defined by claim 3, in which the gas injection pressure is in the range from 80 to 100 bar.

5. A method as defined by claim 1, in which the decomposition gas is injected into the combustion chamber of the engine during the compression stroke of the engine.

6. A method as defined by claim 2, in which the decomposition gas is injected into the combustion chamber of the engine during the compression stroke of the engine.

7. A method as defined by claim 3, in which the decomposition gas is injected into the combustion chamber of the engine during the compression stroke of the engine.

8. A method as defined by claim 4, in which the decomposition gas is injected into the combustion chamber of the engine during the compression stroke of the engine.

9. A method as defined by claim 5, comprising the further steps of controlling a time and duration of the decomposition gas injection by a control unit that processes operating data of the engine and using said control unit to trigger a magnetic valve that meters a quantity of decomposition gas.

10. A method as defined by claim 1, comprising the further step of prior to gasification vaporizing the methanol at high pressure in a vaporizer disposed upstream of the gasification reactor.

11. A method as defined by claim 2, comprising the further step of prior to gasification vaporizing the methanol at high pressure in a vaporizer disposed upstream of the gasification reactor.

12. A method as defined by claim 3, comprising the further step of prior to gasification vaporizing the methanol at high pressure in a vaporizer disposed upstream of the gasification reactor.

13. A method as defined by claim 4, comprising the further step of prior to gasification vaporizing the methanol at high pressure in a vaporizer disposed upstream of the gasification reactor.

14. A method as defined by claim 5, comprising the further step of prior to gasification vaporizing the methanol at high pressure in a vaporizer disposed upstream of the gasification reactor.

15. A method as defined by claim 6, comprising the further step of prior to gasification vaporizing the methanol at high pressure in a vaporizer disposed upstream of the gasification reactor.

16. A method as defined by claim 10, in which said engine further includes a coolant.

17. A method as defined by claim 1, characterized in that the mixture of decomposition gas and air in the combustion chamber of the engine is ignited by high-pressure injection of readily ignitable fuel having an energy proportion of 5 to 10%.

18. A method as defined by claim 2, characterized in that the mixture of decomposition gas and air in the combustion chamber of the engine is ignited by high-pressure injection of the readily ignitable fuel having an energy proportion of 5 to 10%.

19. A method as defined by claim 3, characterized in that the mixture of decomposition gas and air in the combustion chamber of the engine is ignited by high-pressure injection of the readily ignitable fuel having an energy proportion of 5 to 10%.

20. A method as defined by claim 4, characterized in that the mixture of decomposition gas and air in the combustion chamber of the engine is ignited by high-pressure injection of the readily ignitable fuel having an energy proportion of 5 to 10%.

21. A method as defined by claim 16 comprising the further step of preheating said methanol in a heat exchanger driven by the engine coolant prior to vaporizing said methanol.

* * * * *